Feb. 6, 1945. L. N. LEUM ET AL 2,368,931
RECOVERY OF PHENOLS FROM ALKALINE TREATING SOLUTIONS
Filed Sept. 30, 1941
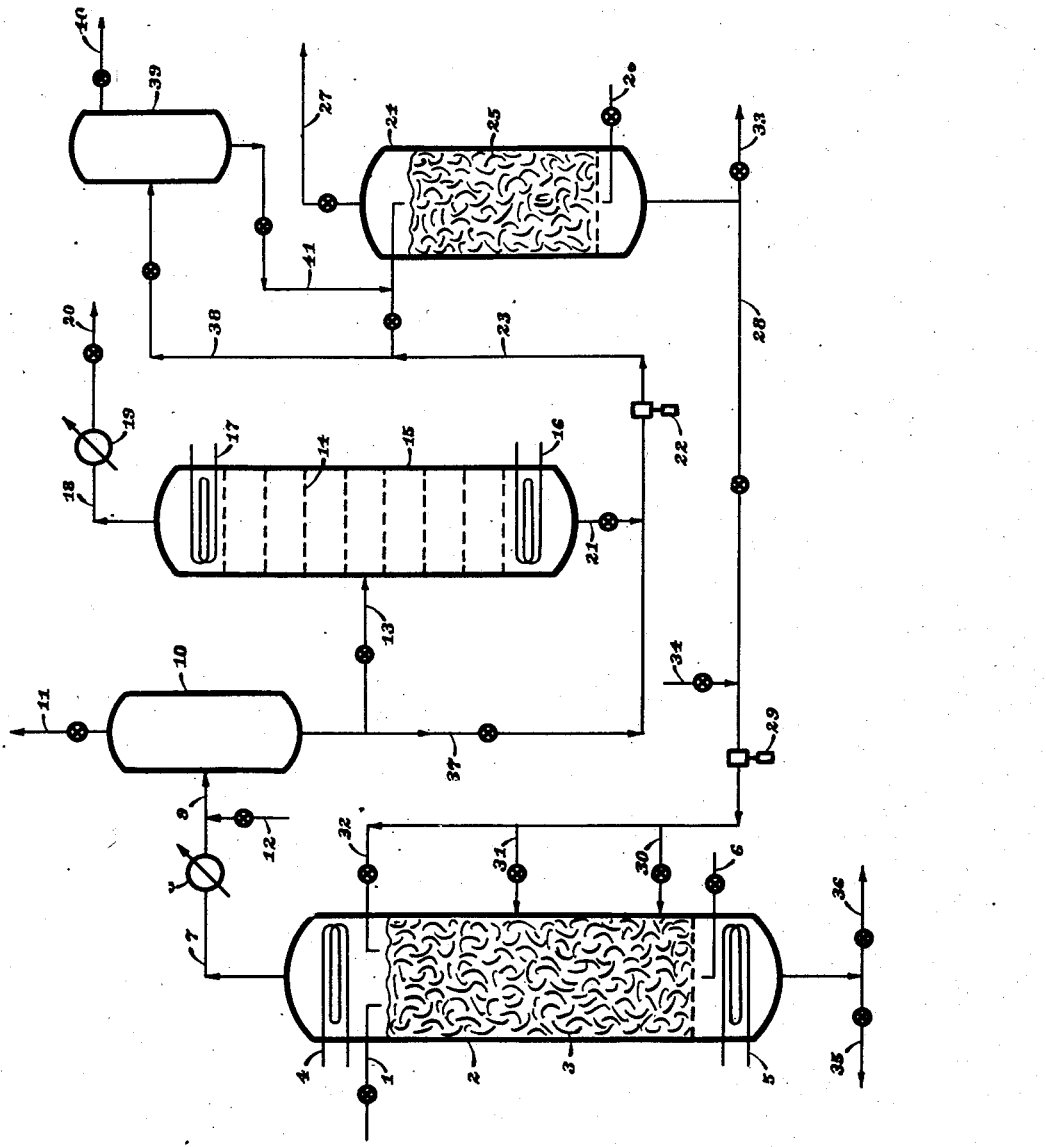
Attest
*Inventors*
*Leonard N. Leum*
*Edwin R. Birkhimer*
*James H. McCullough*
By
*Their Attorney*

Patented Feb. 6, 1945

2,368,931

UNITED STATES PATENT OFFICE 2,368,931

RECOVERY OF PHENOLS FROM ALKALINE TREATING SOLUTIONS

Leonard N. Leum, Upper Darby, and Edwin R. Birkhimer, and James H. McCullough, Philadelphia, Pa., assignors to The Atlantic Refining Company, Philadelphia, Pa., a corporation of Pennsylvania Application September 30, 1941, Serial No. 413,016

8 Claims. (Cl. 260—627)

The present invention relates to the regeneration of alkaline solutions which have been employed in the removal of acidic organic compounds from hydrocarbon oil, and more particularly to the recovery of alkyl phenols liberated during the regeneration of the spent alkaline treating solutions.

In the refining of hydrocarbon oils, especially the lower boiling oils such as gasoline or kerosene, use has been made of aqueous or aqueous solvent solutions of alkaline reagents for the removal of acidic organic compounds such as mercaptans and phenols. In this treatment, the mercaptans and phenols are converted to mercaptides and phenolates which are soluble in the treating solution, and thus may be extracted from the oil. The spent treating solution containing these compounds, after separation from the oil, is then subjected to regeneration in order to recover the alkaline reagent and solvent for reuse in treating additional quantities of oil. The regeneration is usually accomplished by heating or steaming the spent solution to drive off the mercaptans and solvent, and in so doing, a portion of the phenols which it is desired to retain in the treated oil or in the treating solution, are removed along with the mercaptans.

In accordance with this invention, a regenerative treatment is provided in which the phenols are recovered in such state that they may be added to the treated oil or to the treating solution, or may be employed for other purposes such as the manufacture of resins and the like, as desired. Our process comprises essentially the steps of heating or steaming a spent alkaline solution containing mercaptides and phenolates to drive off mercaptans and phenols, together with water or steam, and condensing the vapors to form two immiscible liquid layers, one comprising mercaptans and the other comprising water containing dissolved or suspended phenols. The layers are separated from one another, and the aqueous layer is intimately contacted with a water-insoluble solvent to extract from such layer, the phenols. This process is particularly adapted to the return of recovered phenols to the treated oil, in which case the treated oil, per se, may be employed as the solvent for extracting the phenols from the aqueous layer.

Our invention may be further understood with reference to the accompanying drawing, which illustrates a system suitable for carrying out our process.

A spent solution which has been employed in the desulfurization of petroleum naphtha, and which comprises, for example, water, methanol, free sodium hydroxide, sodium mercaptides, and sodium alkyl phenolates, is delivered by valve-controlled pipe 1 into the upper section of regenerating tower 2 provided with packing 3, cooling coil 4, heating coil 5, and valve-controlled steam jet 6. Heat is applied to the spent solution in tower 2 by circulating steam or other heating medium through coil 5, or by injecting open steam into the solution through valve-controlled jet 6. The temperature at the bottom of the tower may be of the order of 280° F., while that at the top of the tower is about 215° F. to 220° F. As a result of the heating, the mercaptides and a portion of the alkyl phenolates are decomposed, with the liberation of an equivalent amount of sodium hydroxide, and the mercaptans, alkyl phenols, methanol, and a portion of the water content of the spent solution are vaporized, withdrawn from the top of the tower through pipe 7, condensed in condenser 8, and the condensate delivered by pipe 9 to separator 10. This condensate may comprise, for example, an aqueous solution containing 15 per cent to 30 per cent by weight of methanol, alkyl phenols and 10 to 40 mg. sulfur as RSH per 100 cc., admixed with insoluble mercaptans. The condensate is permitted to settle and stratify in separator 10, whereby there is formed an upper layer of insoluble mercaptans containing a small amount of alkyl phenols, and a lower aqueous layer containing 15 per cent to 30 per cent methanol, alkyl phenols, and 10 to 40 mg. mercaptan sulfur. The upper layer of insoluble mercaptans is removed from separator 10 by means of valve-controlled pipe 11, and may be disposed of as desired. By this separation, 95 per cent or more of the mercaptans entering the separator with the condensate are removed from the aqueous-methanol solution containing the alkyl phenols, only the lower molecular weight mercaptans remaining, to a small extent, in solution in the aqueous-methanol and alkyl phenols. In the event that insufficient water is distilled over with the methanol, mercaptans, and alkyl phenols to effect the desired separation of immiscible layers in separator 10, additional water may be introduced by means of valve-controlled pipe 12.

The aqueous-methanol solution containing alkyl phenols and traces of mercaptans is withdrawn from the bottom of separator 10 and passed by means of valve-controlled pipe 13 into fractionating tower 15 provided with bubble trays 14, heating coil 16, and dephlegmating coil 17. In the fractionating tower 15, the methanol and traces of mercaptans are vaporized and fractionally distilled from the aqueous solution containing the alkyl phenols, the temperature at the top of the tower being of the order of 150° F., and at the bottom about 212° F. During the fractionation a small amount of water is distilled over with the methanol and mercaptans, and the composite vapor is withdrawn from the top of tower 15 by means of pipe 18, condensed in condenser 19, and the condensate removed from the system through valve-controlled pipe 20. This condensate may comprise methanol containing up to about 10 per cent of water and up to about 70 mg. mercaptan sulfur, and is substantially free of alkyl phenols. In this state, it is suitable for use in the treatment of additional quantities of naphtha, and may be recirculated for making up aqueous methanol solutions of sodium hydroxide for desulfurizing naphtha.

The bottoms or residue from the distillation comprising water containing dissolved and suspended alkyl phenols is withdrawn from the fractionating tower 15 through valve-controlled pipe 21 and delivered by pump 22 and valve-controlled pipe 23 to the upper section of extraction tower 24 provided with packing 25. A water-insoluble organic solvent, for example, petroleum naphtha which has been previously treated with an alkaline solution and which may have a reduced content of phenolic compounds, is introduced into the lower section of tower 24 by means of valve-controlled pipe 26. The naphtha, in flowing countercurrently upward in intimate contact with the descending aqueous solution containing alkyl phenols, extracts from such solution a substantial proportion of the alkyl phenols, the temperature of the extraction being of the order of 60° F. to 140° F. The naphtha containing the extracted alkyl phenols is drawn from the top of tower 24 through valve-controlled pipe 27, and may be employed as a stabilized motor fuel, the alkyl phenol content imparting thereto desirable anti-oxidant properties. In lieu of treated naphtha, other water-insoluble solvents may be employed, including untreated naphtha, either straight-run or cracked, benzene, toluene, xylene, chlorinated hydrocarbons, water-insoluble alcohols, ketones, and ethers such as butyl alcohol, amyl alcohol, butyl ether, isobutyl ketone, and the like.

In the event that the aqueous bottoms or residue from the fractionating tower 15 contains a relatively large proportion of suspended alkyl phenols, such bottoms may be withdrawn from tower 15 by means of valve-controlled pipe 21, and pumped by pump 22 through pipe 23 and valve-controlled pipe 38 to separator 39, wherein the suspended phenols may be separated from the aqueous bottoms and drawn off through valve-controlled pipe 40, the remaining aqueous bottoms containing dissolved phenols being passed from the bottom of separator 39 by means of valve-controlled pipe 41 into the extraction tower 24 for treatment with a water-insoluble solvent.

The water, substantially free of or containing only a small amount of alkyl phenols, is withdrawn from the bottom of tower 24, and may be returned to the regenerating tower 2 by means of valve-controlled pipe 28, pump 29, and one or more of valve-controlled pipes 30, 31, and 32. If desired, a portion of the alkyl phenol-free water may be removed from the system through valve-controlled pipe 33, and, when necessary, fresh aqueous sodium hydroxide solution may be introduced into the system by means of valve-controlled pipe 34.

Referring again to regenerating tower 2, the regenerated aqueous solution of sodium hydroxide containing sodium alkyl phenolates and a reduced content of mercaptides, for example, about 450 mg. mercaptan sulfur per 100 cc., is withdrawn from the bottom of tower 2 by means of valve-controlled pipe 35, and may be reused in the treatment of additional quantities of naphtha which it is desired to desulfurize. At such time as it becomes necessary to withdraw a small portion of the regenerated solution from the system, in order to prevent a build-up of sodium alkyl phenolates in the system, such portion may be taken from the bottom of tower 2 through valve-controlled pipe 36, and replaced with fresh sodium hydroxide solution introduced through valve-controlled pipe 34.

While we have described our process particularly with reference to the recovery of alkyl phenols from an alkaline treating solution containing an organic solvent such as methanol, our process is also adapted to the recovery of such phenolic compounds from alkaline solutions which do not contain solvents. For example, a cracked naphtha containing mercaptans and alkyl phenols may be treated with an aqueous solution of sodium hydroxide (35 per cent to 50 per cent concentration of NaOH) containing sodium alkyl phenolates (200 to 600 grams per liter), whereby there is produced a desulfurized naphtha of reduced alkyl phenol content and a spent aqueous treating solution containing free sodium hydroxide, sodium mercaptides, and sodium phenolates. The spent solution is separated from the treated naphtha, and charged to the regenerating tower 2, wherein it is heated sufficiently to drive off mercaptans, and a portion of the water and alkyl phenols. The resulting vapors are condensed in condenser 8, and the mercaptans are separated from the water layer containing the alkyl phenols in separator 10. In order to increase the solubility of the alkyl phenols in the water layer, a quantity of a water-soluble organic solvent such as methanol, ethanol, or acetone may be introduced by means of pipe 12 into the condensate passing through pipe 9 into separator 10. By incorporating such solvent in the water, less alkyl phenols are lost in the mercaptan layer which is drawn from the top of separator 10 through valve-controlled pipe 11. The lower aqueous layer containing solvent and alkyl phenols is then processed as hereinbefore described for the separation of the solvent and the recovery of the alkyl phenols. In the event that no auxiliary solvent, for example, methanol, is employed to assist solution of the alkyl phenols in the aqueous layer in separator 10, such aqueous layer containing alkyl phenols may be passed directly from the separator 10 by means of valve-controlled pipe 37, pump 22, and pipe 23 to the extraction tower 24, for recovery of the alkyl phenols by extraction with a water-insoluble solvent.

Our process is thus adapted for the recovery of alkyl phenols from aqueous solutions of alkali metal hydroxides containing alkyl phenols, or from aqueous solutions of alkali metal hydroxides containing alkyl phenols and water-soluble organic solvents, such as methanol, ethanol, propanol, isopropanol, acetone, ethyl methyl ketone, glycol, glycerol, polyglycols, and glycol ethers, and the like. Such process is of particular importance in the recovery of alkyl phenols from spent alkaline solutions which have been used in the desulfurization of gasoline and which have removed from the gasoline, alkyl phenols which it is desired to retain therein. By employing treated gasoline in the final extraction step of our process, the alkyl phenols may be maintained in the gasoline in the concentration desired for inhibiting oxidation, gum and color formation, and the like.

We claim:

1. A process of recovering alkyl phenols from an aqueous alkaline solution containing alkali metal alkyl phenolates, which comprises heating said solution to vaporize therefrom alkyl phenols and water, condensing the alkyl phenol vapors and water vapors, and treating the condensate with a water-insoluble solvent to extract therefrom alkyl phenols.

2. A process of recovering alkyl phenols from an aqueous alkaline solution containing alkali metal alkyl phenolates, which comprises heating said solution to vaporize therefrom alkyl phenols and water, condensing the alkyl phenol vapors and water vapors, and treating the condensate with a hydrocarbon solvent to extract therefrom alkyl phenols.

3. A process of recovering alkyl phenols from an aqueous alkaline solution containing alkali metal alkyl phenolates and mercaptides, which comprises heating said solution to vaporize therefrom alkyl phenols, mercaptans, and water, condensing the alkyl phenol vapors, mercaptans, and water vapor to form two liquid phases, one comprising mercaptans and the other comprising water and alkyl phenols, separating the phases, and treating the water-alkyl phenol phase with a water-insoluble solvent to extract therefrom alkyl phenols.

4. A process of recovering alkyl phenols from an aqueous alkaline solution containing alkali metal alkyl phenolates and mercaptides, which comprises heating said solution to vaporize therefrom alkyl phenols, mercaptans, and water, condensing the alkyl phenol vapors, mercaptans, and water vapor, commingling with the condensate a water-soluble solvent for the alkyl phenols, separating from the condensate a liquid phase comprising mercaptans and a second liquid phase comprising water, water-soluble solvent, and alkyl phenols, distilling from said second liquid phase the water-soluble solvent, and treating the distillation residue comprising water and alkyl phenols with a water-insoluble solvent to extract therefrom alkyl phenols.

5. A process of recovering alkyl phenols from an aqueous alcoholic solution containing alkali metal hydroxide, alkyl phenolates, and mercaptides, which comprises heating said solution to vaporize therefrom alcohol, alkyl phenols, mercaptans, and water, condensing the alcohol vapors, alkyl phenols, mercaptans and water vapor to form two liquid phases, one comprising mercaptans and the other comprising alcohol, water, and alkyl phenols, separating the phases, fractionally distilling the phase last mentioned to separate therefrom the alcohol, and treating the distillation residue comprising water and alkyl phenols with a water-insoluble solvent to extract therefrom alkyl phenols.

6. A process of recovering alkyl phenols from an aqueous methanol solution containing alkali metal hydroxide, alkyl phenolates, and mercaptides, which comprises heating said solution to vaporize therefrom methanol, alkyl phenols, mercaptans, and water, condensing the methanol vapors, alkyl phenols, mercaptans and water vapor to form two liquid phases, one comprising mercaptans and the other comprising methanol, water, and alkyl phenols, separating the phases, fractionally distilling the phase last mentioned to separate therefrom the methanol, and treating the distillation residue comprising water and alkyl phenols with a water-insoluble solvent to extract therefrom alkyl phenols.

7. A process of recovering alkyl phenols from an aqueous methanol solution containing alkali metal hydroxide, alkyl phenolates, and mercaptides, which comprises heating said solution to vaporize therefrom methanol, alkyl phenols, mercaptans, and water, condensing the methanol vapors, alkyl phenols, mercaptans and water vapor to form two liquid phases, one comprising mercaptans and the other comprising methanol, water, and alkyl phenols, separating the phases, fractionally distilling the phase last mentioned to separate therefrom the methanol, and treating the distillation residue comprising water and alkyl phenols with a hydrocarbon solvent to extract therefrom alkyl phenols.

8. A process of recovering alkyl phenols from an aqueous methanol solution containing alkali metal hydroxide, alkyl phenolates, and mercaptides, which comprises heating said solution to vaporize therefrom methanol, alkyl phenols, mercaptans, and water, condensing the methanol vapors, alkyl phenols, mercaptans and water vapor to form two liquid phases, one comprising mercaptans and the other comprising methanol, water, and alkyl phenols, separating the phases, fractionally distilling the phase last mentioned to separate therefrom the methanol, and separating alkyl phenols from the aqueous distillation residue.

LEONARD N. LEUM.
EDWIN R. BIRKHIMER.
JAMES H. McCULLOUGH.